Nov. 17, 1936.   E. G. CARROLL   2,060,854
BRAKE
Filed May 18, 1932   5 Sheets-Sheet 1
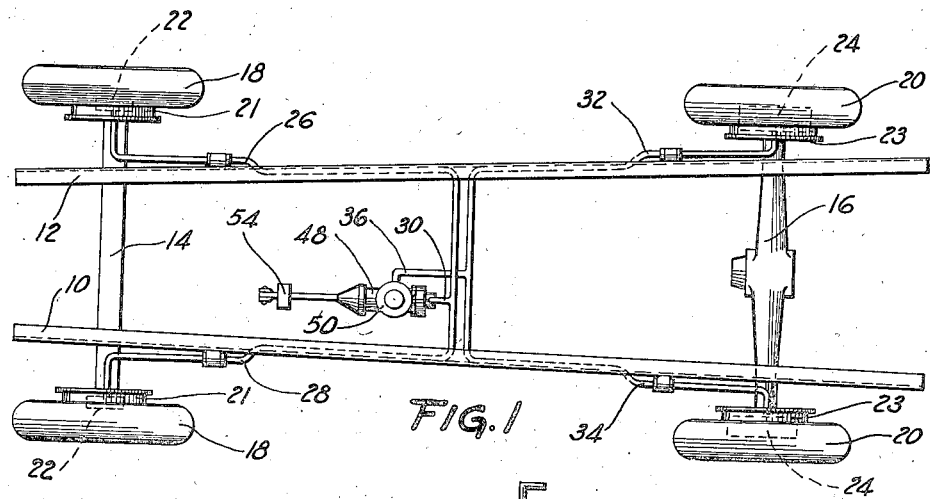
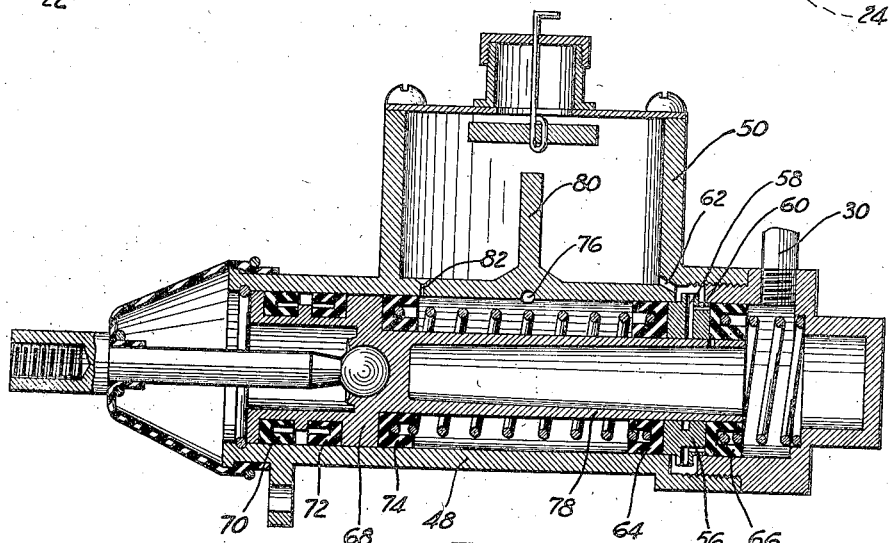
INVENTOR.
EUGENE G. CARROLL
BY
Jerome R. Cox
ATTORNEY

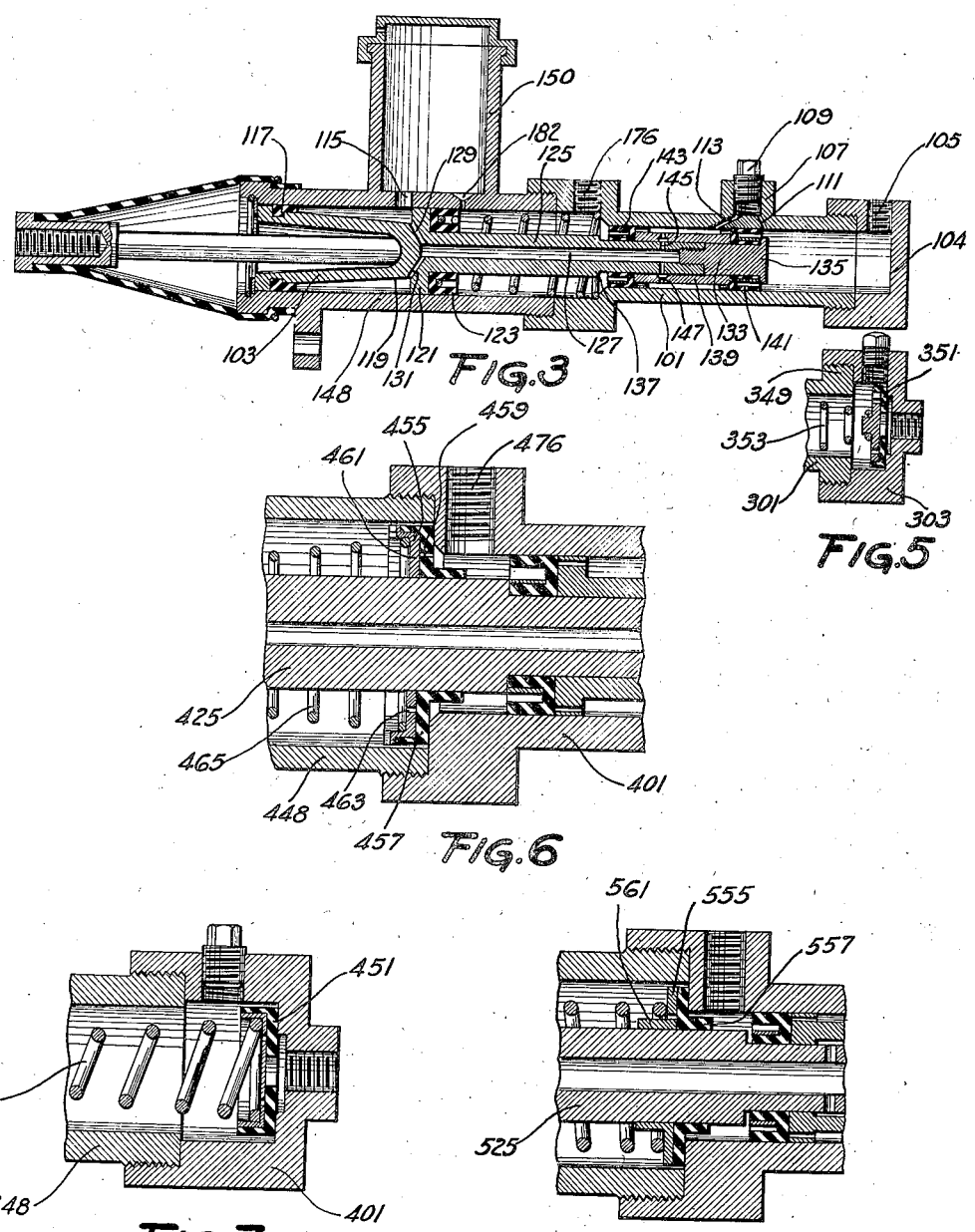

Nov. 17, 1936.  E. G. CARROLL  2,060,854
BRAKE
Filed May 18, 1932    5 Sheets-Sheet 3

INVENTOR.
EUGENE G. CARROLL
BY
Jerome R. Cox
ATTORNEY

Nov. 17, 1936.    E. G. CARROLL    2,060,854
BRAKE
Filed May 18, 1932    5 Sheets-Sheet 4

INVENTOR.
EUGENE G. CARROLL
BY Jerome R. Cox
ATTORNEY.

Patented Nov. 17, 1936

2,060,854

UNITED STATES PATENT OFFICE 2,060,854

BRAKE

Eugene G. Carroll, South Bend, Ind., assignor to Bendix Aviation Corporation, South Bend, Ind., a corporation of Delaware Application May 18, 1932, Serial No. 612,138

17 Claims. (Cl. 60—54.6)

This invention relates to braking systems and is illustrated as applied to a hydraulic braking system.

One of the objects of this invention is to reduce the danger of failure of hydraulic brakes through leaks developing in the braking system.

A feature of the invention is the provision of an attachment capable of being secured to a hydraulic master cylinder of ordinary design for converting it into a dual system.

A further feature of the invention is the provision of an annular two way check valve for use in association with such a system.

Further objects and features of the invention will be apparent after a reading of the subjoined specification and claims and after a consideration of the attached drawings in which:

Figure 1 is a plan view of a chassis of an automobile equipped with a hydraulic braking system constructed according to my invention;

Figure 2 is a view in section of the master cylinder shown in Figure 1;

Figure 3 is a view in section and on an enlarged scale of a modified form of master cylinder;

Figure 5 is a view in section and on an enlarged scale of another modified detail of a master cylinder similar in most respects to the cylinder of Figure 3;

Figure 6 is a view in section and on an enlarged scale of still another modified detail of a cylinder similar in most respects to that shown in Figure 3;

Figure 7 is a view in section and on an enlarged scale of another modified detail of a master cylinder constructed in most respects like the cylinder shown in Figure 3;

Figure 8 is a view in section and on an enlarged scale showing another modified detail of a cylinder constructed in most respects like the master cylinder shown in Figure 4;

Figure 4:
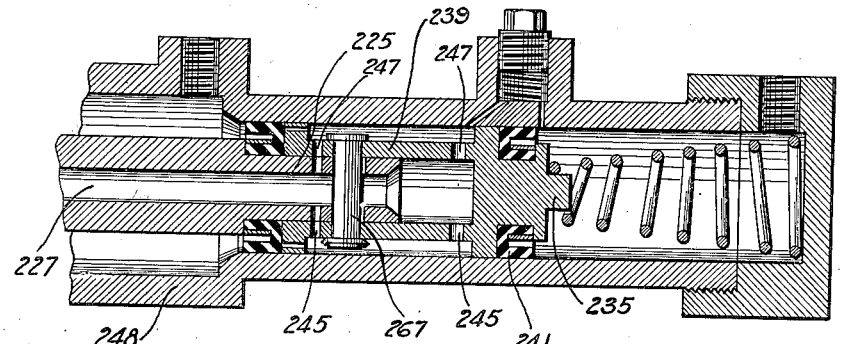
Figure 4 is a view in section of a fragment of a master cylinder illustrating a modified detail of a master cylinder similar in most respects to the cylinder of Figure 3.

Referring in detail to the drawings, I have shown in Figure 1 an automobile chassis provided with side rails 10 and 12 and provided with a front axle 14 and a rear axle 16 for supporting the frame. Front wheels 18 and rear wheels 20 support the front and rear axles respectively. Each of the wheels 18 is provided with a brake 21 adapted to be operated by a wheel cylinder 22. Each of the wheels 20 is provided with a brake 23 adapted to be operated by a wheel cylinder 24, the cylinders 24 being substantially larger than the cylinders 22. For instance the wheel cylinders 22 may have a diameter of 1¼ inches and the wheel cylinders 24 may have a diameter of 1⅜ inches. The wheel cylinders for the front wheels 18 are supplied with liquid through conduits 26, 28, and 30 and the wheel cylinders of the rear wheels 20 are supplied with liquid through conduits 32, 34, and 36. The conduits 30 and 36 being connected to a master cylinder 48.

The master cylinder 48 is provided with an annular head 56 which is positioned adjacent to the front end of the cylinder and which is so assembled with the cylinder that it is capable of a limited amount of movement longitudinally of the cylinder. The head is provided with a plurality of bores such as 58 and 60 which are connected through an inclined passageway 62 with the reservoir 50. Associated with the head 56 are a pair of annular cups 64 and 66 which allow passage of fluid in both directions from the head but prevent its passage toward the head. Slidably mounted in the cylinder 48 is a plunger 68 provided at its rear end with a pair of annular cups 70 and 72 which face in opposite directions and seal the rear end of the plunger. Forward of the cups 70 and 72 the plunger is provided with an annular cup 74 which serves to force fluid from the cylinder through an opening 76 to conduit 36 and through said conduit to the rear brakes. The plunger is provided with a forwardly extending concentric projection 78 which extends through the annular head 56 and is adapted to force liquid out through the conduit 30 to the front brakes. The area of the annular cup 74 bears the same relation (preferably 1 to 1) to the area of the rear brake wheel cylinders as the area of the projection 78 bears to the area of the front brake wheel cylinders. The reservoir 50 is provided with a partition 80 dividing the reservoir into two compartments one of which is connected through a restricted port 82 with the rear compartment of the master cylinder and thus is associated with the rear brakes and the other of which is connected through the ports 62 with the forward compartment of the master cylinder and thus is associated with the forward brakes. It is to be especially noted that the opening 76 is formed in line with the partition 80 so that the enlarged portion provided in the wall of the cylinder for the opening coincides with the enlarged portion provided for the partition.

In the operation of this hydraulic braking system liquid is supplied to the reservoir 50 and entering the master cylinder through the ports 82 and 62 fills the master cylinder and the lines leading to the wheel cylinders and the wheel cylinders themselves. Thereafter, pressure upon the pedal 54 forces the plunger 68 forward and thus displaces liquid separately from both the front and rear compartments through the various conduits to the rear and front brakes respectively. Differences in pressure between the rear brakes and the front brakes are equalized by means of slight movement of the head 56. However, should a leak develop in either system the head 56 will soon reach its limit of movement and regardless of the fact that the leak has destroyed the efficiency of one set of brakes, the efficiency of the other set would be retained completely operative. The partition in the reservoir will insure that the reserve supply of liquid for the operative system will be safely maintained.

By reason of the fact that the wheel cylinder diameters are of different sizes, the pistons in the master cylinder may be constructed of different sizes and thus I am enabled to keep the total diameter of the master cylinder relatively small. If it were necessary to have the area of the plunger 78 as large as that of the cup 74, the cylinder would be much larger because the minimum size of the cup 74 is limited.

In Fig. 3, I have shown a modified form of master cylinder. Therein the cylinder proper 148 is the same as that which is ordinarily used in single system brakes. The cap at the front end thereof is removed and the attachment cylinder 101 is secured in its place. The usual piston is also removed and the piston 103 is substituted. The cylinder 101 is formed with an outlet opening 176 adapted to be connected to one set of brakes and is provided with a cap 104 having an opening 105 adapted to be connected to the other set of brakes. Intermediate its ends it is provided with a well 107 which is closed at its upper end by a plug 109 and which is connected with the interior of the cylinder by a pair of inclined bores 111 and 113. The cylinder 148 is provided with a restricted port 182 and rearwardly thereof with a relatively large opening 115, both of which connect with a reservoir 150.

The plunger 103 is provided at its rearward end with a sealing cup 117 and is formed in advance of said cup with a recess 119 with which the opening 115 is adapted to communicate. Ahead of said recess the plunger 103 is formed with a piston head 121 provided with an annular cup valve 123 which is normally positioned just rearwardly of the port 182 but is adapted to be moved forward past said port. The plunger 103 is formed ahead of said piston 121 with a forwardly extending reduced piston 125 which has its forward end extending forward into the cylinder 101. This extension is formed with a longitudinally extending bore 127. The piston rearwardly of the head 121 is formed with a pair of inclined bores 129 and 131 connecting with the bore 127 and leading therefrom to the recess 119. The front end of the extension 125 is closed by a plug 133 having an enlarged head 135 and intermediate the head 135 and a shoulder 137 formed on the projection 125 is an annular floating head. This head comprises a guide member 139 and a pair of annular packing cups 141 and 143 which face in opposite directions away from the guide member. Ports 145 are formed through the front part of the extension 125 and connect with ports 147 formed in the guide member 139.

In the operation of this form of master cylinder, liquid is introduced into the reservoir 150 and passing through opening 115 and port 182 enters the master cylinder. Part of the liquid entering the master cylinder passes through the bores 129, 131, and 127 and through the ports 145 and 147 into the recess formed around the guide 139. Thence this liquid passes through the ports 113 and 111 into the front part of the cylinder. Thereafter, it is forced to the front wheel cylinders through conduits connected with the openings 105 and 176. Movement of the plunger 103 cuts off the ports 182 and 111 and thereafter the piston 121 forces fluid to one set of brakes while piston 125 forces fluid to the other set of brakes. Equalization of pressure is normally maintained by slight movements (relative to the piston 125) of the floating head formed by the guide 139 and cups 141 and 143.

In Figure 4 I have shown a portion of a master cylinder 248 similar to the cylinder shown in Figure 3. However, the forward extension is formed integrally with the cylinder. The annular guide member 239 forming a part of the annular floating head is secured to the front end of the piston 225 by a pin 267 which has a relatively loose fit in slots in the piston 225 and the guide member 239. The bore 227 extends through the front end of the piston 225 and communicates with a recess formed in the guide member 239. The front end of the guide member forms a movable head 235 which is provided with a groove for the reception of the cup 241. Slots 245 and 247 are provided in the piston 225 and the guide member 239 respectively.

In Figure 5 I have shown a modified detail. Therein the cylinder 301 is provided with a flange 349 corresponding substantially to the forward end of the cylinder 148. Thus the cap 303 which originally was provided for the front end of the cylinder 148 may be utilized in place of the cap 104. Also, the two-way check valve 351 and the spring 353 (which are also adapted to be used in the cylinder 148) may also be utilized.

In Figure 6 I have shown a modified detail. Therein the cylinder 448 (to which the attachment cylinder 401 is secured) is provided with an annular valve 455 for maintaining a slight superatmospheric pressure in the set of brakes connected with the port 476. This valve is adapted to surround the extension 425. It is formed of a rubber washer 457 formed with oppositely extending flanges and provided with ports such as 459; metallic guide 461 formed with ports 463; and a spring 465 normally urging the valve upon its seat. It is to be especially noted that the ports 463 are offset from the port 459. Liquid under pressure may be forced freely through the ports 463 and deflecting the rubber packing slightly may pass forward to the braking system associated with the one set of brakes. However, liquid returning presses the rubber packing tightly against the guide member 461 and prevents liquid from passing until the pressure becomes sufficient to lift the valve from its seat against the pressure of the springs 465 whereupon liquid may pass around the outside thereof. The guide 461 is flanged and has at intervals on the circumference thereof small tongues bent outward and embedded into the rubber washer 457 in order to maintain the guide and washer in proper relation to each other and to properly position the ports 459 and 463.

In Figure 7 there is shown the front end of the cylinder 401. Associated therewith is a valve 451 somewhat similar to the valve 351 which is held upon its seat by a spring 453.

In Figure 8 is shown a valve 555 somewhat similar to the valve 455. However, the rubber packing 557 and the metallic guide 561 are L-shaped in cross section and no ports are provided through the packing 557, the conformation thereof being such that the liquid will lift the valve from the contact with the guide 561 and from the contact with the piston 525.

Figure 9:
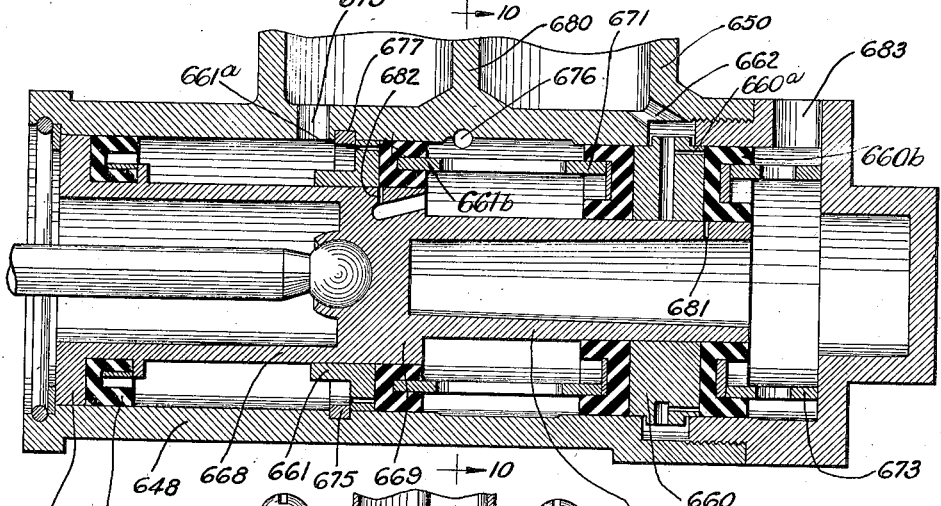
Figure 9 is a view in section of a master cylinder similar in many respects to the master cylinder of Figure 2.
Figure 10:
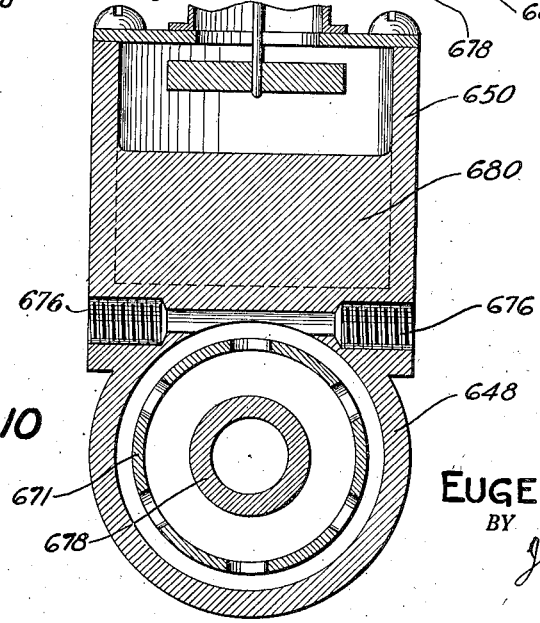
Figure 10 is a view in section taken substantially on the line 10—10 of Figure 9.
Figure 11:
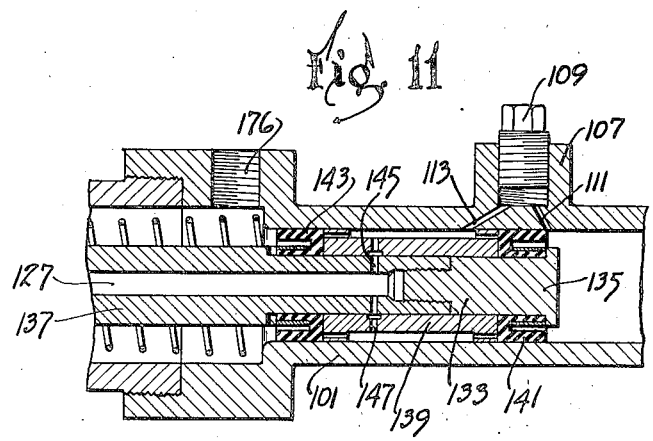
Figure 11 is a sectional view of a portion of Figure 3 on a larger scale.
Figure 12:
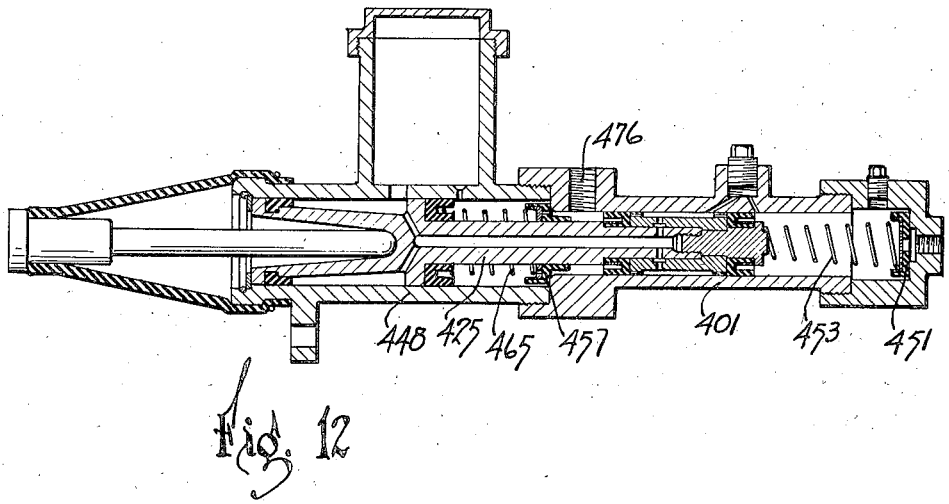
Figure 12 is an organization view incorporating the features of Figures 6 and 7.
Figure 13:
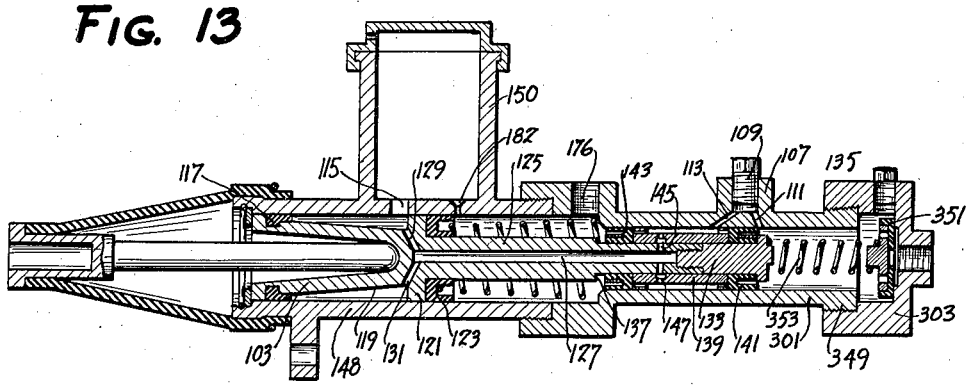
Figure 13 is an organization view incorporating the features of Figures 3 and 5.
Figure 14:
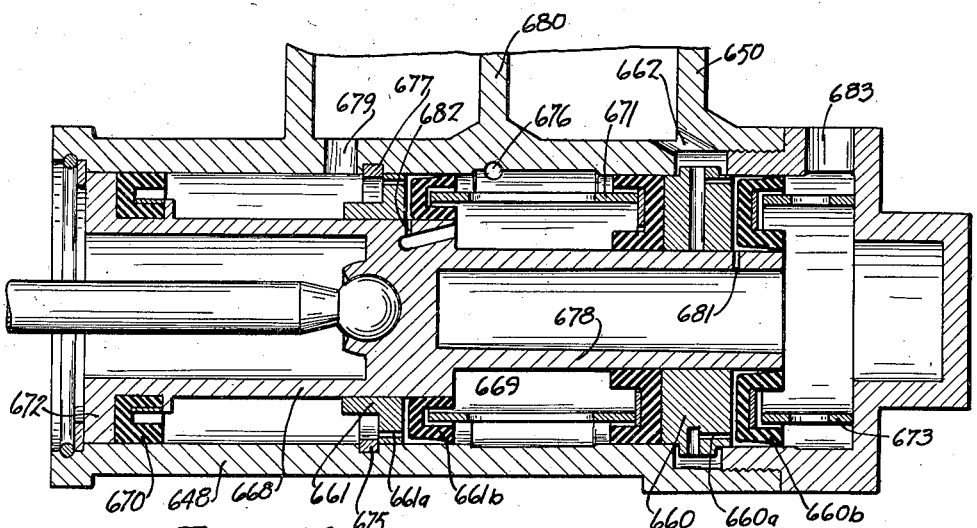
Figure 14 is a view corresponding to Figure 9 showing the structure when the brakes have just been released and showing the master cylinder piston sealing cups displaced so as to allow the passage of liquid past said cups, the displacement of the cups being exaggerated.

In Figures 9 and 10 there is shown a master cylinder 648 provided with a plunger 668 having pistons 669 and 678 adapted to slide between cooperating annular heads 660 and 661. The heads 660 and 661 are substantially fixed being maintained in position by slotted rings 671 and 673 and by a resilient split ring 675 fitted in a groove 677 formed in the cylinder 648. Slight play is allowed in the head 660 so as to equalize pressures between the front and the rear.

The rear end of the plunger 668 is provided with a piston 672 and a cup 670 therefor. The reservoir 650 is provided with a partition 680 and is connected to the cylinder through openings 662 and 679. Ports 682 and 681 allow substantially free passage of liquid into the compression compartments when the cylinder is in its normal position as shown inasmuch as liquid may flow through ports 662 and 679, thence through the bores 660ª and 661ª to the back of the cups 660ᵇ and 661ᵇ, then compressing and deflecting the rubber cups 660ᵇ and 661ᵇ through the ports 681 and 682. The cylinder is provided with an outlet opening 683 leading to the front wheel cylinders and with a pair of outlet openings 676 by which it is connected separately with the right rear wheel cylinder and the left rear wheel cylinder respectively.

It is to be understood that the above described embodiments of my invention are for the purpose of illustration only and various changes may be made therein without departing from the spirit and scope of the invention.

I claim:

1. For a master cylinder for a hydraulic braking system for dual sets of brakes, a cylindrical casting adapted to be secured to said master cylinder, means for securing said casting to the front end of said master cylinder, a piston extending into said casting, means for connecting the interior of said casting to one set of brakes, separate means for connecting the interior of said casting to the other set of brakes, a reservoir, means for connecting said reservoir to the center of said casting, and a plurality of separate means for preventing passage of fluid past said means from said connecting means respectively toward the center of said casting while allowing substantially free passage in the opposite direction past said means, fluid being allowed to flow freely in both directions between said center and one of said connecting means when the piston is in its normal released position.

2. In a hydraulic brake apparatus, a master cylinder having a front end and a rear end, a plunger positioned in said master cylinder adapted to be moved from the rear end toward the front end of the cylinder in applying the brakes and formed with a passageway extending from adjacent to the front end thereof toward the rear, a piston associated with said plunger at a point adjacent to the front end of said passageway, a packing cup forming a part of said piston and adapted to allow passage of fluid forward past said cup while preventing passage of fluid rearwardly, another piston associated with said plunger rearwardly of the first mentioned piston and serving together with the first mentioned piston to isolate a portion of the cylinder separate from the front end and the rear end, a second packing cup associated with said second piston and adapted to allow passage of fluid rearwardly past said cup while preventing passage of fluid forwardly, means connecting said passageway to said isolated portion, a reservoir, and means for supplying fluid from said reservoir to the rear end of said passageway.

3. In a hydraulic brake system; a master cylinder having a front end and a rear end; a plunger slidably mounted in said master cylinder adapted to be moved from the rear end toward the front end of the cylinder in applying the brakes, formed with a central passageway, and having an opening leading into said passageway adjacent to the front end of the plunger; a piston associated with said forward end of the plunger and including a packing cup adapted to prevent the passage of liquid rearwardly past said cup while allowing passage of liquid forwardly past said cup; another piston associated with said plunger rearwardly of the first mentioned piston and serving together with the first mentioned piston to isolate a portion of the cylinder separated from the front end and the rear end; a second packing cup associated with said second piston and adapted to allow passage of fluid rearwardly past said cup while preventing passage of fluid forwardly; means for connecting said central passageway to said isolated portion; a fluid reservoir; and means for supplying liquid from said reservoir to said passageway.

4. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, and sealing means for preventing passage of fluid from said openings to said recess through said sealing means, fluid being allowed to flow freely in both directions between said recessed portion and one of said connecting means when the piston is in its normal released position.

5. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, sealing means for preventing passage of fluid from said openings to said recess through said sealing means, fluid being allowed to flow freely in both directions between said recess to one of said openings when the piston is in its normal released position, and means for supplying fluid to said recess.

6. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, sealing means for preventing passage of fluid from said openings to said recess through said sealing means, fluid being allowed to flow freely in both directions between said reservoir and one of said openings when the piston is in its normal released position, and means for supplying fluid to said recess, said means utilizing a longitudinal passageway in said plunger and ports through the sides of said plunger.

7. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings, and sealing means for preventing passage of fluid from said openings to said recess through said sealing means, said fluid being allowed to flow freely in both directions between said reservoir and one of said openings when the piston is in its normal released position, said sealing means comprising rubber cups which allow substantially free passage of fluid from said recess forward and rearwardly to said openings at all times.

8. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, sealing means for preventing passage of fluid from said openings to said recess through said sealing means, and means for at times by-passing fluid around one of said sealing means, fluid being allowed to flow freely in both directions through said by-pass means between said reservoir and one of said openings when the piston is in its normal released position.

9. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, and sealing means for preventing passage of fluid from said openings to said recess through said sealing means, said cylinder being provided with a pair of interconnected ports for by-passing fluid at times around one of said sealing means, fluid being allowed to flow freely in both directions by way of said ports between said reservoir and one of said openings when the piston is in its normal released position.

10. In a hydraulic breaking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, sealing means for preventing passage of fluid from said openings to said recess through said sealing means, fluid being allowed to flow freely in both directions between said reservoir and one of said openings when the piston is in its normal released position, and a cylindrical extension for the front end of the cylinder into which the front end of said plunger extends.

11. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, sealing means for preventing passage of fluid from said openings to said recess through said sealing means, a cylindrical extension for the front end of the cylinder into which the front end of said plunger extends, and a by-pass around one of said sealing means adapted to be closed at times by said front end of the plunger, fluid being allowed to flow freely through said by-pass in both directions between said reservoir and one of said openings when the piston is in its normal released position.

12. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings and connected to said reservoir, sealing means for preventing passage of fluid from said openings to said recess through said sealing means, fluid being allowed to flow freely in both directions between said reservoir and one of said openings when the piston is in its normal released position, a cylindrical casting adapted to be secured to said cylinder into which the front end of said plunger extends, and means for securing said casting to the front end of said cylinder.

13. In a hydraulic braking system for a plurality of sets of brakes, a master cylinder having a front end and a rear end and formed with a plurality of openings each leading to one of said plurality of sets of brakes, a plunger extending through said cylinder and adapted to be moved from the rear end toward the front end thereof in applying the brakes and formed with a recessed portion positioned intermediate its ends and between said openings, sealing means for preventing passages of fluid from said openings to said recess through said sealing means, means for supplying fluid to said recess comprising a fluid reservoir connected thereto, and a pair of interconnected ports leading around one of said sealing means, adapted to be closed at times by said plunger, fluid being allowed to flow freely through said ports in both directions between said reservoir and one of said openings when the piston is in its normal released position.

14. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and having a supply port associated therewith intermediate its ends and between said openings and connected to said reservoir, and a pair of sealing cups each located between one of said openings in said port for preventing passage of fluid from said openings to said port past said cups.

15. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and having a supply port associated therewith intermediate its ends and between said openings, said supply port being connected to said reservoir, and sealing means for preventing passage of fluid from said openings to said port through said sealing means, said sealing means comprising a pair of rubber cups each located between one of said openings and said port which allow substantially free passage of fluid from said port forward and rearwardly to said openings at all times.

16. In a hydraulic braking system for a plurality of sets of brakes, a reservoir, a master cylinder having a front end and a rear end and formed with a plurality of openings each leading to one of said plurality of sets of brakes, a plunger extending through said cylinder and adapted to be moved from the rear end toward the front end thereof in applying the brakes and having a supply port associated therewith intermediate its ends and between said openings, and connected to said reservoir, a pair of sealing cups each located between one of said openings and said port for preventing passage of fluid from said openings to said port past said sealing cups, and means for at times by-passing fluid around one of said sealing means.

17. In a hydraulic braking system having a plurality of sets of brakes, a master cylinder provided with a plunger having two piston heads of different diameters and having an outlet leading to one set of brakes connected with the forward end of said master cylinder and another outlet leading to another set of brakes connected with one of the side walls of said master cylinder, means comprising a spring loaded annular valve surrounding said plunger within said cylinder for preventing the passage of fluid from one of said openings rearward of the master cylinder except when the fluid is under relatively high pressure while allowing substantially free passage of fluid forward of said cylinder.

EUGENE G. CARROLL.

CERTIFICATE OF CORRECTION.

Patent No. 2,060,854.             November 17, 1936.

EUGENE G. CARROLL.

It is hereby certified that error appears in the printed specification of the above numbered patent requiring correction as follows: Page 4, first column, line 40, claim 7, after "openings" insert the words and connected to said reservoir; and second column, line 12, claim 10, for "breaking" read braking; and that the said Letters Patent should be read with these corrections therein that the same may conform to the record of the case in the Patent Office.

Signed and sealed this 5th day of October, A. D. 1937.

Henry Van Arsdale (Seal)                      Acting Commissioner of Patents.